United States Patent Office 3,279,325
Patented Oct. 18, 1966

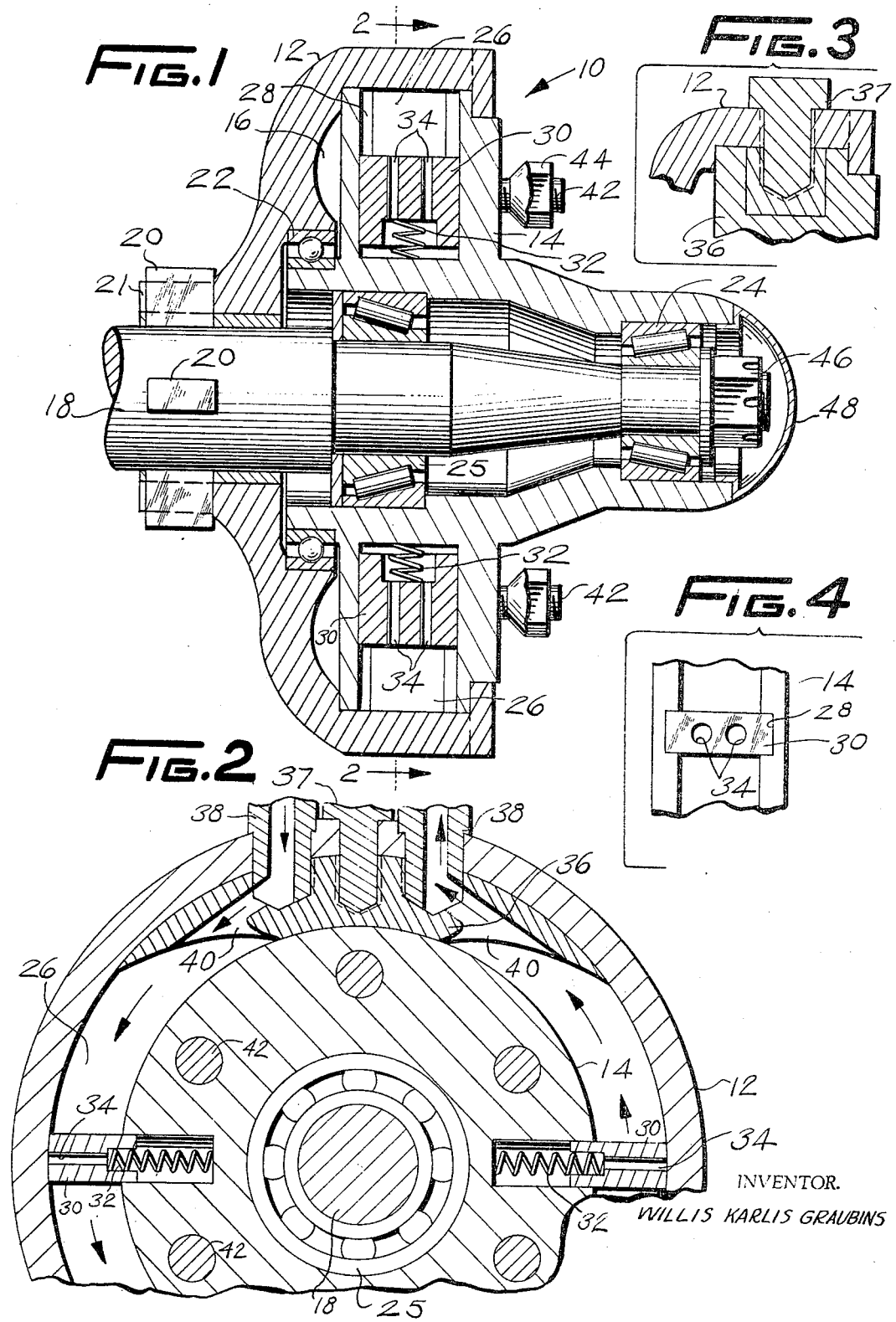

3,279,325
HYDRAULICALLY DRIVEN WHEEL HUB
Willis Karlis Graubins, 1757 N. Campbell Ave.,
Chicago, Ill.
Filed Feb. 24, 1964, Ser. No. 346,840
2 Claims. (Cl. 91—137)

This invention relates to fluid driven rotary devices and more particularly to the hydraulically driven wheel hub.

It is an object of the present invention to provide a hydraulically driven wheel hub which will transfer power to wheels by hydraulic means.

Another object of the present invention is to provide a hydraulically driven wheel hub which, by selector valve means in the hydraulic system, will instantly reverse the direction of rotation of the hub.

A further object of the present invention is to provide a hydraulically driven wheel hub which, by reversing the direction of flow through the lines of the apparatus, will throttle the fluid in the hydraulic system during the operation and create a back pressure at the rotor vanes which will prevent the rotor and wheel from turning freely, so that a braking effect can be produced in the rotating parts which may be increased or eliminated when desired.

A still further object of the present invention is to provide a hydraulically driven wheel hub which will be so constructed as to be balanced to provide for smooth, vibrationless efficiency in operation.

Other objects of the invention are to provide a hydraulically driven wheel hub bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which:

FIGURE 1 is a side elevational view of the present invention shown in section;

FIGURE 2 is a cross sectional view taken along the lines 2—2 of FIGURE 1;

FIGURE 3 is a sectional side view of the fluid distributor shown in FIGURE 2; and FIGURE 4 is an end view of one of the vanes shown in FIGURE 2.

Referring now more in detail to the drawing, a hydraulically driven wheel hub 10 made in accordance with the present invention is shown to include a bell-shaped housing 12 having a rotor 14 received within its cavity 16. Housing 12 and rotor 14 are made of high quality tool steel and housing 12 is stationary upon axle 18 by means of a plurality of radial projections 20 extending from the outer periphery of axle 18. Projections 18 are received through slotted openings 21 of housing 12. A bearing 22 is received within housing 12 and is received on one end of rotor 14 and provides additional stability for rotor 14 within cavity 16 of housing 12. A roll bearing 24 is received on the extremity of axle 19 within rotor 14 and a roller bearing 25 is spaced apart from bearing 24 and is received within rotor 14 aroud axle 18 providing an anti-friction mounting means for rotor 14 upon axle 18 in conjunction with roller bearing 24 on the extremity of axle 18. Rotor 14 is provided with an annular channel 26 through its outer major periphery which provides for the travel of hydraulic fluid. Channel 26 is formed from three sides, by the rotor body 14 and the outer side is closed by the tightly adhering wall of the housing 12. Rotor body 14 contains a plurality of cutouts 28 which are radially in alignment with the central axis of rotor 14 and cutouts 28 extend within the rotor body 14 toward the outer side and into the channel 26. Each rotor section has a vane 30 which is free to move in the cutouts 28. Vanes 30 provide a means for closing channel 26 when required during the operation of the device. To facilitate the movement through the cutouts 28 into the lowest portion of the cutouts 28 a pressure spring is provided which will hereinafter be described. Springs 32 urge against vanes 30 which are provided with a pair of spaced apart openings 34 through which the hydraulic fluid can ingress freely during the operation, below the vanes 30, to prevent the creation of a vacuum in the bottom portion of the cutouts 28. A fluid distributor 36 is tightly embedded into the rotor channel 26 and is secured to the hub housing 12. A bolt 37 is externally threaded and threadingly receives the distributor 36 to secure it to housing 12. A pair of hydraulic fluid lines 38 and 38' are secured to the housing 12 and provide for circulation of hydraulic fluid through spaced apart openings 40 and 40' through fluid distributor 36. Hydraulic fluid may be introduced into either opening 40 or opening 40' depending upon the rotation direction desired for rotor 14. A plurality of radially spaced apart studs 42 extend from rotor 14 and are provided with threaded nuts 44 for securing a wheel to hub 10. A safety nut 46 is threadingly received on the threaded extremity of axle 18 and a hollow arcuate cover 48 is snappably engaged over nut 46 within rotor 14.

In operation, fluid lines 38 and 38' are connected to a hydraulic control system, and hydraulic fluid entering under pressure through the fluid distributor 36 is directed into the roller channel 26 where it strikes one of the vanes 30 which blocks further course of the fluid through the channel 26. The pressure differential building up between the vane 30 and the fluid, which finally is operated by pump and forced into the lines, operates on the vane 30 and imparts rotation to rotor 14. After rotor 14 has completed the half revolution, the next vane 30 passes through the area of the fluid distributor 36 and into the channel and again blocks the flow of hydraulic fluid by being cammed against spring 32 by the arcuate curvature of distributor 36. In this manner the second vane 30 absorbs the entire pressure and keeps rotor 14 in motion. After the second vane 30 has entered into the operation, the first vane 30 passes through the channel 26 without load, until it arrives at the fluid distributor body 36, from which it is picked up and pushed into the cutout 28. After passing under the distributor body 36, the vane 30 is pushed into channel 26 again by the pressure spring 32 and again placed into the operating process, thus repeating the cycle of operation. The hydraulic fluid passing through channel 26 passes as far as the distributor body 36, which blocks the channel 26 so that the fluid can be collected and discharged through one of the discharge lines 38 or 38', depending upon the direction of rotation desired.

It shall be noted that if hydraulic fluid is inserted through the former discharge line, the rotor 14 and the wheel (not shown) will rotate in the opposite direction. As a result of this feature, either fluid line 38 or 38' may be used for the ingress of hydraulic fluid into the device, and the fluid flowing through the discharge line is throttled somewhere in the hydraulic system during the operation, thus a counter pressure or back pressure is created at the rotor vane which prevents rotor 14 and its associated wheel from turning freely so that a braking effect is produced in the rotating parts which may be increased or eliminated if desired.

It shall further be noted that to obtain a balanced effect of force in the hub 10, the rotor 14 may be constructed with several vanes 30 and similarly the hub 10 may be constructed with two or more fluid distributors 36.

While various changes may be made in the detail construction, it shall be understood that such changes shall be within the spirit and scope of the present invention as defined by the appended claims.

What I claim as new and desire to protect by Letters Patent of the United States is:

1. A hydraulically driven wheel hub comprising, in combination, a housing, a hollow rotor rotatably secured within said housing, an axle rotatably supported within said housing and said rotor, a fluid distributor carried by said housing, stabilizer ball bearing means on said axle, a pair of spaced apart roller bearings carried by said rotor to provide support means for said rotor on said axle, a pair of radially extendable vanes carried by said rotor and being adapted to abut against the continuous arcuate outer edge of said fluid distributor, said vanes in cooperation with the hydraulic fluid pressure supplied by said distributor adapted to direct the force of hydraulic fluid for induction of the rotary motion into said rotor, said continuous arcuate outer edge of said fluid distributor causing said vanes to be moved radially into the inward direction, and internally threaded safety nut adapted to secure said rotor upon the threaded extremity of said axle, said vanes provided with a pair of spaced apart openings for admitting free ingress of said hydraulic fluid during the operation of the rotor portion located below the vanes, thereby preventing the creation of a vacuum in the lower extremity of the cutouts of said rotor portion, a coil return spring received within a recessed portion of each of said vanes, said spring adapted to provide outward pressure against said vanes to return them to the inner periphery of said housing after said vanes have been cammed downward by said continuous arcuate outer edge of said fluid distributor, a pair of fluid lines connected to said distributor for providing means for the input and output of said hydraulic fluid through the channel of said rotor, said fluid distributor provided with a pair of openings, each opening adapted to intersect with one of said fluid lines which are arranged to extend through said housing, bolt means adapted to secure said distributor within said housing thus causing said distributor to remain stationary during the operation of said hub, said vanes during the rotation of said rotor are urged downward into said rotor flush with said continuous arcuate outer edge of said fluid distributor, said rotor when passing the vertical center of said fluid distributor adapted to admit said hydraulic fluid through said opening of said fluid distributor and to continue the rotation when said vane passes the vertical center of said hub, and said spring beneath said vane capable of urging said vane outwardly of said rotor and into the path of said hydraulic fluid.

2. The combination according to claim 1, wherein means is provided for reversal of said hydraulic fluid flow through said fluid lines and said fluid distributor openings thus intersecting said lines for rotating said rotor in an opposite direction when desired by selective valve means in the hydraulic pump system which is capable of driving said hub, thereby effecting breaking means within said hub by throttling said hydraulic fluid and creating a counter pressure at the effected vane which prevents said rotor from turning.

References Cited by the Examiner

UNITED STATES PATENTS

| | | | |
|---|---|---|---|
| 883,575 | 3/1908 | Schaefer | 91—140 |
| 2,350,683 | 6/1944 | Jossim et al. | 180—66 X |
| 2,418,123 | 4/1947 | Joy | 180—66 |
| 2,539,490 | 1/1951 | Smith | 180—66 |
| 2,650,573 | 9/1953 | Hickman | 91—140 X |
| 2,752,893 | 7/1956 | Oleskow | 91—140 |

MARTIN P. SCHWADRON, *Primary Examiner.*

SAMUEL LEVINE, *Examiner.*

A. S. ROSEN, PETER T. COBRIN, *Assistant Examiners.*